Patented Feb. 12, 1929.

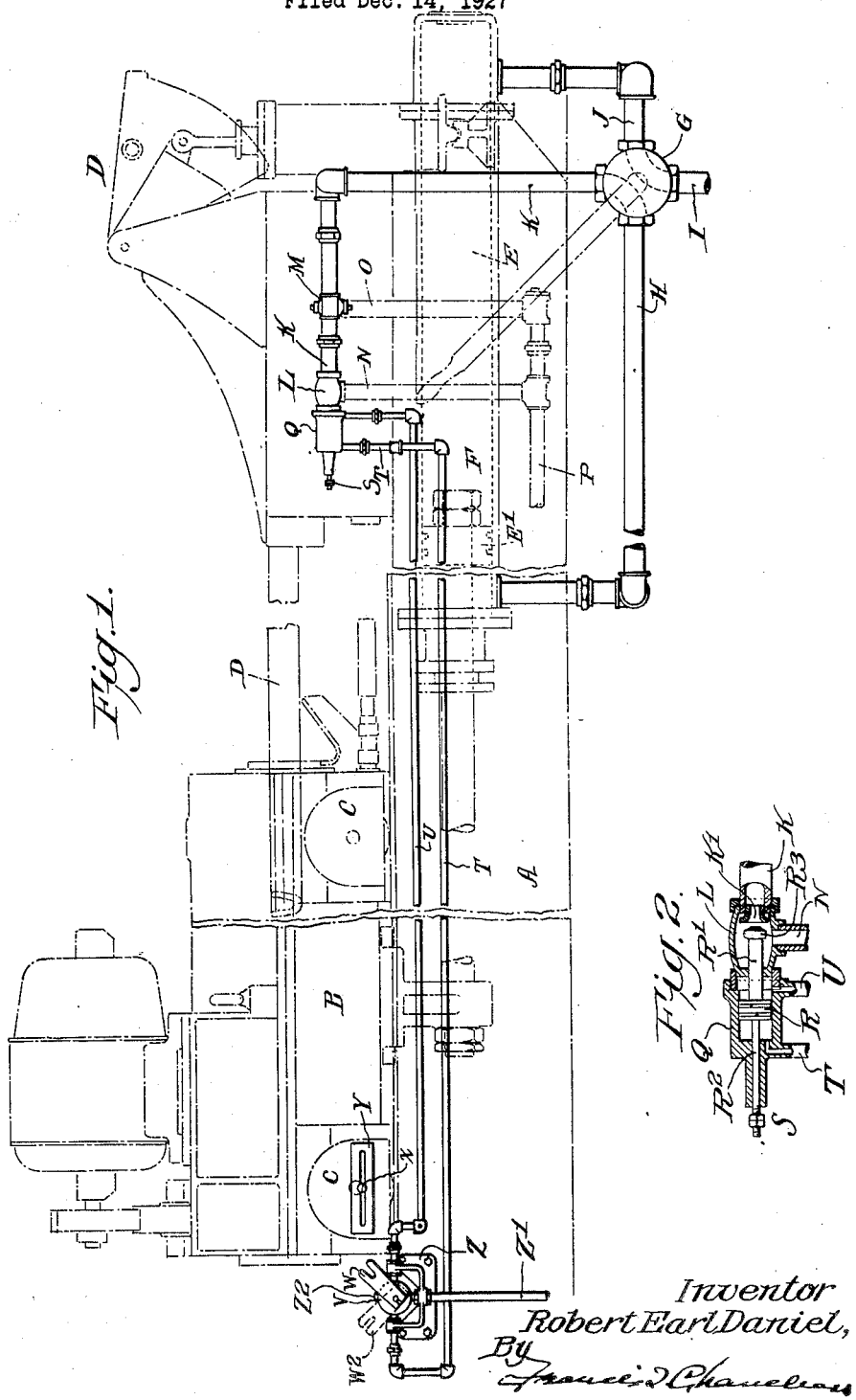

1,701,530

UNITED STATES PATENT OFFICE.

ROBERT EARL DANIEL, OF BIRMINGHAM, ALABAMA, ASSIGNOR TO UNITED STATES CAST IRON PIPE & FOUNDRY COMPANY, OF BURLINGTON, NEW JERSEY, A CORPORATION OF NEW JERSEY.

CENTRIFUGAL CASTING MACHINE.

Application filed December 14, 1927. Serial No. 239,837.

My invention relates to centrifugal pipe casting machines of the de Lavaud type in which the mold water box and other appliances are supported on a reciprocating carriage actuated by a hydraulic cylinder, and the object of my invention it to provide means for slowing down without abruptly arresting the motion of the carriage as it nears the end of its stroke during which the pipe is cast.

Generally speaking, my invention consists in providing in the exhaust conduit leading from the hydraulic cylinder means for restricting the flow of fluid therein, in providing a fluid actuated motor for shifting said restricting means from active to nonactive positions, in providing a valve to control the fluid passing to and from the motor and in providing means whereby the carriage as it approaches the end of its working stroke shifts the valve in one direction so as to actuate the motor to shift the restricting device to operative position and whereby the valve is again shifted as the carriage begins its return stroke. By preference, I use as a restricting device a valve or its equivalent held in flow restricting position by the yielding fluid pressure actuating the motor against the flow of the exhaust fluid.

My invention will be best understood as described in connection with the drawings which illustrate a de Lavaud pipe casting machine provided with my improvement and in which Figure 1 is a side elevation and Figure 2 is a sectional elevation of the flow restricting mechanism.

A is the frame of the machine; B, the carriage; C, the carriage wheel housings. D is the runner for molten iron. F is the hydraulic cylinder for moving the carriage and E the piston moving in said cylinder. G is a four way valve. I, a pipe leading from a source of fluid under pressure. H and J, pipes leading to opposite ends of cylinder F. K is the exhaust pipe embodying a valve casing L from which it extends further, as shown at N and P. M is a manually operatable bye pass valve normally closing the bye pass conduit O.

Q is a motor cylinder; R, a piston having rods $R^1$ and $R^2$ extending through the ends of the cylinder, the rod $R^1$ extending into valve casing L and supporting a valve $R^3$ movable towards and away from a seat $K^1$. The rod $R^2$ is threaded and has a nut or nuts screwing upon it to serve as stops to regulate the approach of valve $R^3$ to the seat $K^1$.

T and U are pipes for fluid under pressure; they connect to the ends of cylinder Q and to a four way valve V, to which also is connected a pipe $Z^1$ for fluid under pressure and an exhaust pipe $Z^2$. Z is the frame supporting the valve and W a forked lever for actuating the valve, movable between the position shown in full lines and in dotted lines at $W^2$. Y is a slotted plate secured to wheel housing C and supporting a pin X, which is adjustable in the slot and located to engage the fork in lever W.

In operation, valve G, being in the position shown, pressure fluid from I is admitted to the right hand end of cylinder F and the exhaust from its left hand end flows into exhaust pipes K, N, P. The carriage B is moved towards the left and the pipe poured as it so moves. As the carriage nears the end of its stroke, the pin X engages the forked valve lever W and shifts valve V to conduit supply pipe $Z^1$, to pipe T so that pressure fluid enters the left hand end of cylinder Q while its opposite end in connected through pipe U to exhaust. Piston R is moved towards the right and valve $R^3$ shifted towards seat $K^1$ restricting the flow of the exhaust through valve casing L and slowing down the motor of the carriage. The reverse motion of the carriage at once shifts valve V and retracts the valve $R^3$.

Having now described my invention, what I claim as new and desire to secure by Letters Patent, is:

1. In a centrifugal pipe casting machine comprising a reciprocating carriage supporting the mold, a hydraulic cylinder and piston connected to actuate the carriage, a source of fluid under pressure, conduits connecting said source to opposite ends of the hydraulic cylinder, an exhaust conduit and a valve for connecting the cylinder conduits alternately with the source and the exhaust conduit, the combination therewith of means for restricting the flow of fluid through the exhaust conduit, a cylinder and piston for actuating said means, pipes for fluid under pressure connected to the opposite ends of said cylinder, a supply pipe for pressure fluid, an exhaust pipe for said fluid, a valve for connecting the pipes leading to the cylinder ends alternately to the supply pipe and the exhaust pipe, a valve lever for actuating said valve and means connected with the carriage for actuating said valve lever at the end of the stroke of the carriage during which the casting is poured so as to actuate the means for restricting the exhaust to resist said exhaust at the end of said stroke and to remove said resistance at the beginning of the reverse stroke of the carriage.

2. In an apparatus as called for in claim 1, the construction of the means for restricting the exhaust in the form of a valve movably to restrict the exhaust in a direction opposite to the flow of the exhaust fluid.

3. In an apparatus as called for in claim 1, the provision of an exhaust bye pass having a manually controlled valve.

ROBERT EARL DANIEL.